United States Patent [19]
Gregg et al.

[11] Patent Number: 5,804,294
[45] Date of Patent: Sep. 8, 1998

[54] MICROPOROUS INSULATION FOR DATA RECORDERS AND THE LIKE

[75] Inventors: William Michael Gregg, Bristol; Patrick Scott Heller, Goshen, both of Ind.; Spencer Ivan Meier, Parker; Monroe W. Shumate, Littleton, both of Colo.

[73] Assignee: The Morgan Crucible Company plc, Windsor, England

[21] Appl. No.: 510,348

[22] Filed: Aug. 2, 1995

[51] Int. Cl.$^6$ ......................................................... B32B 3/26
[52] U.S. Cl. ........................ 428/315.5; 252/62; 501/95.1; 501/121; 501/122; 501/133
[58] Field of Search ..................................... 106/638, 672, 106/677, 711; 428/315.5; 252/62; 501/95.1, 121, 122, 133

[56] References Cited

U.S. PATENT DOCUMENTS

| | | |
|---|---|---|
| 2,808,338 | 10/1957 | Bruno et al. . |
| 2,811,457 | 10/1957 | Speil et al. . |
| 3,055,831 | 9/1962 | Barnett et al. . |
| 4,600,634 | 7/1986 | Langer ...................................... 428/220 |
| 4,921,894 | 5/1990 | Shumate . |

OTHER PUBLICATIONS

Material Safety Data Sheet for Interam E–5A, E–5AE, and E10A Mats (issued Jun. 27, 1986).

Material Safety Data Sheet for Microporous Specialty Insulation [including Flexible Min–K, Min–K Sheets and Molded Shapes, Faced Flexible Min–K, and Sonite}](issued Aug. 1, 1994).

*Primary Examiner*—Christopher Raimund
*Attorney, Agent, or Firm*—Dean W. Russell; Kilpatrick Stockton LLP

[57] ABSTRACT

A microporous insulation material contains an ingredient which exhibits a phase transition and functions to maintain temperatures attained by an object shielded by the microporous insulation material, during exposure of the microporous insulation material to a high temperature environment, at an acceptable level over a given period of time. The insulation material is especially suitable for insulating flight data and voice recorder systems. The microporous insulation material contains inorganic particulate material; endothermic compounds, an opacifier, inorganic fiber and preferably, a dry resin binder. The inorganic particulate material can comprise only hydrophilic material or both hydrophilic and hydrophobic material.

26 Claims, 3 Drawing Sheets

FDR TEST-MIN-K 1302W
FLIGHT DATA RECORDER TEST
MIN-K PRODUCTS

| SUMMARY DATA | INS PCF | LBS H$_2$O |
|---|---|---|
| 1) MIX 138-MIN-K 1302 W/ATH & WATER | 35 | 2.33 |
| 2) MIN-K 1302 W/WATER | 18 | 1.80 |
| 3) 3M E5A W/WATER | 65 | 1.96 |
| 4) MIN-K 1302 | 20 | 0 |
| 5) MIN-K 2000 | 20 | 0 |

| TIME | 1 | 2 | 3 | 4 | 5 |
|---|---|---|---|---|---|
| 0:00:00 | 68 | 111 | 75 | 126 | 73 |
| 0:10:00 | 201 | 248 | 175 | 159 | 104 |
| 0:20:00 | 210 | 248 | 212 | 227 | 195 |
| 0:30:00 | 213 | 248 | 212 | 302 | 315 |
| 0:40:00 | 216 | 248 | 256 | 382 | 444 |
| 0:50:00 | 219 | 248 | 374 | END | END |
| 1:00:00 | 223 | 247 | END | END | END |
| 1:10:00 | 230 | 264 | END | END | END |
| 1:20:00 | 254 | 320 | END | END | END |
| 1:30:00 | 308 | 410 | END | END | END |
| 1:40:00 | 385 | 564 | END | END | END |
| 1:50:00 | 490 | END | END | END | END |
| 2:00:00 | END | END | END | END | END |

FDR TEST- MIN-K 1302 VARIATIONS VS. E5A
FLIGHT DATA RECORDER TESTS MIN-K PRODUCTS

| SUMMARY DATA | INS PCF | LBS $H_2O$ |
|---|---|---|
| 1) MIX 138-MIN-K 1302 W/ATH & WATER | 35 | 2.33 |
| 2) MIN-K 1302 W/WATER | 18 | 1.80 |
| 3) 3M E5A W/WATER | 55 | 1.96 |
| 4) MIN-K 1302 | 20 | 0 |
| 5) MIN-K 1302 WITH ATH (DRY) | 35 | 0 |

| TIME | 1 | 2 | 3 | 4 | 5 |
|---|---|---|---|---|---|
| 0:00:00 | 68 | 111 | 75 | 126 | 76 |
| 0:10:00 | 201 | 248 | 175 | 159 | 190 |
| 0:20:00 | 210 | 248 | 212 | 227 | 271 |
| 0:30:00 | 213 | 248 | 212 | 302 | 272 |
| 0:40:00 | 216 | 248 | 256 | 382 | 296 |
| 0:50:00 | 219 | 248 | 374 | END | 354 |
| 1:00:00 | 223 | 247 | END | END | 424 |
| 1:10:00 | 230 | 264 | END | END | 505 |
| 1:20:00 | 254 | 320 | END | END | 591 |
| 1:30:00 | 308 | 410 | END | END | END |
| 1:40:00 | 385 | 564 | END | END | END |
| 1:50:00 | 490 | END | END | END | END |
| 2:00:00 | END | END | END | END | END |

MICROPOROUS INSULATION FOR DATA RECORDERS AND THE LIKE

BACKGROUND OF THE INVENTION

The invention relates to a microporous insulation containing one or more ingredients which undergo phase transitions as the temperature of the microporous insulation is raised and, in particular, to such an insulation material that is suited for use in shielding flight data and voice recorders from fires and high temperature environments.

There are numerous insulating applications, such as, fire safes, cable trays and fire walls where it is desirable or necessary to insulate and protect items, devices, assemblies and/or areas from high temperature environments or fire. One very important insulating application is the insulation and shielding of flight data and voice recorders from the high temperature environment and fire frequently present after an aircraft has crashed. U.S. Pat. No. 4,694,119; issued Sep. 15, 1987; and entitled "Heat Shielded Memory Unit for an Aircraft Flight Data Recorder", discloses an insulating system in which a layer of wax encapsulates the recorder and, in turn, is enclosed within a thermal liner of MIN-K 2000 insulation or a similar insulation liner. At a certain temperature the wax undergoes a phase transition and functions as a heat sink to keep the temperature of the recorder below a certain critical temperature.

SUMMARY OF THE INVENTION

The present invention is directed to a microporous insulation which includes endothermic compounds within the insulation structure and further enhances the already excellent insulating properties of the microporous insulation. Unlike the insulation system of the '119 patent, a separate layer of wax or other phase transition material is not required. The endothermic compounds within the microporous insulation of the present invention undergo phase changes when exposed to certain elevated temperatures, redirect thermal energy, maintain the temperature of the microporous insulation at a certain level for a period of time, and release chemically bound water and/or mechanically bound water and/or other gases which carry away additional heat from the component(s) or assembly(s) being insulated and shielded from a high temperature environment.

The microporous insulation of the present invention is especially suitable for insulating applications involving fire and other high temperature environments. When compared with certain traditional microporous insulation systems of the same thickness used for flight data recorder applications, the microporous insulation of the present invention has shown a 40–130% increase in the survival time of protected components. It is expected that the microporous insulation of the present invention would exhibit similar results in other high temperature applications.

The microporous insulation material of the invention contains inorganic particulate material; an endothermic compound; an opacifier; inorganic fiber; water and preferably, where structural integrity is required, a dry resin binder. When the microporous insulation material is to be used for applications where moisture may negatively impact the item or assembly being protected, the inorganic particulate material is hydrophilic and is processed as a dry powder. When the microporous insulation material is to be used for applications where moisture can be tolerated, the inorganic particulate material is partially hydrophilic and partially hydrophobic and is processed to allow the absorption of water. The amount of water that the microporous insulation will hold is controlled by the amount of hydrophilic particulate material used in the insulation and the structural integrity of the insulation is maintained by the hydrophobic particulate material in the microporous insulation. The addition of water to the microporous insulation material results in an insulation that maintains the temperature of the insulation material at about 250° F. or below for an extended period of time during environmental exposures of up to 2000° Fahrenheit.

DESCRIPTION OF THE PREFERRED EMBODIMENTS

Figure 1:
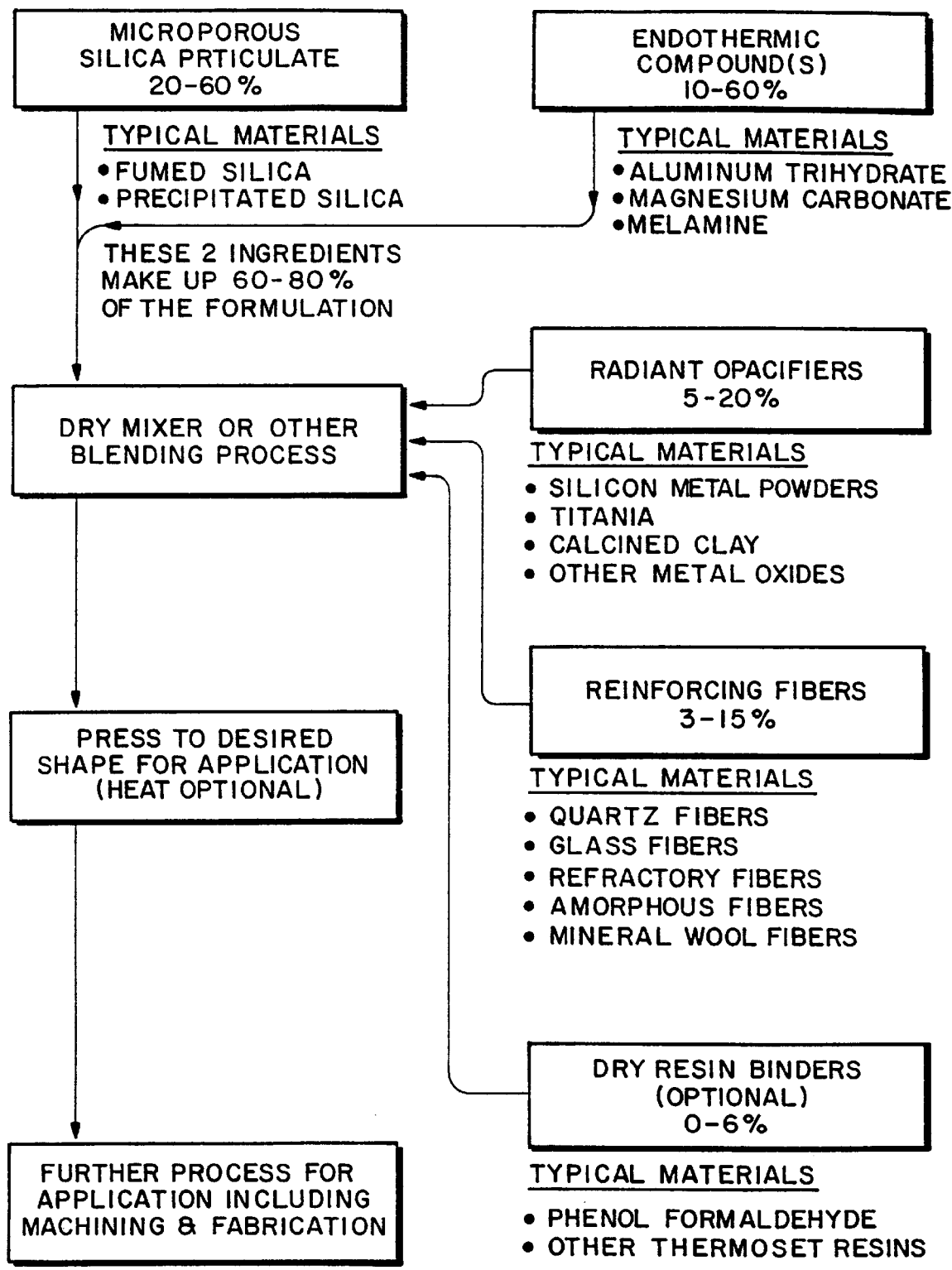
FIG. 1 is a schematic of the process for making the microporous insulation material of the present invention.

The microporous insulation of the present invention contains the following ingredients at the indicated weight percentage levels or ranges which are based upon the dry weight of the microporous insulation material prior to adding any water to the water saturated embodiments.

| INGREDIENTS | WT % |
| --- | --- |
| Inorganic Particulate Material(s) | 20–60 |
| Endothermic Compound(s) | 10–60 |
| Opacifier(s) | 05–20 |
| Inorganic Reinforcing Fiber | 03–15 |
| Dry Resin Binder | 0–06 |

The inorganic particulate material and the endothermic compound(s) make up 50–89 wt % of the microporous insulation material. The microporous insulation material to be used in dry systems where moisture can be detrimental to the item or assembly being insulated and shielded, uses a hydrophilic inorganic particulate material. The microporous insulation material to be used in water soaked systems where the item or assembly being insulated and shielded can tolerate moisture, uses a blend of the inorganic particulate materials with about 50–95 wt % of the inorganic particulate material being hydrophilic and about 5–50 wt % of the inorganic particulate material being hydrophobic and preferably about 70–95 wt % of the inorganic particulate material being hydrophilic and about 5–30 wt % of the inorganic particulate material being hydrophobic.

In one preferred embodiment of the present invention, the microporous insulation material comprises about: (a) 34–38 wt % inorganic particulate material; 47–51 wt % endothermic compound(s); 7–8 wt % opacifier(s); 4–6 wt % inorganic fiber; and 0–3 wt % dry resin binder. Two examples of this embodiment are a microporous insulation material which contains about: (a) 36.5 wt % fumed silica with a surface area of about 200 $m^2/g$; 49 wt % aluminum trihydrate; 7.5 wt % silicone powder; 4 wt % quartz fiber; 1 wt % glass fiber; and 2 wt % phenol formaldehyde wherein the fumed silica is hydrophilic and a microporous insulation material, identical to the first microporous insulation material, except that the fumed silica is about 85 wt % hydrophilic and 15 wt % hydrophobic plus the addition of water.

In a second preferred binderless embodiment of the present invention, the microporous insulation material comprises about: 28–32 wt % inorganic particulate material(s); 48–52 wt % endothermic compound(s); 13–17 wt % opacifier(s); and 4–5 wt % inorganic fiber. Two examples of this second preferred embodiment are a microporous insulation material containing about: 30.5 wt % fumed silica with a surface area of about 200 $m^2/g$; 50 wt % alumina trihydrate; 15 wt % silicone powder; and 4.5 wt % glass and amorphous wool fiber wherein the fumed silica is hydrophilic and a second microporous insulation material, identical to the first, except that about 85 wt % of the fumed silica is hydrophilic and 15 wt % of the fumed silica is hydrophobic plus water. This binderless embodiment of the microporous insulation material of the present invention is used where the microporous insulation material is encapsulated within a covering and in other applications where the integrity of the microporous insulation material is not important for the application.

The hydrophilic inorganic particulate material employed in the present invention acts as a filler and a bulking agent in both the dry insulation system and the wet insulation system of the present invention. In the wet insulation system, the hydrophilic inorganic particulate material also functions to absorb and retain water which undergoes a phase change at about 212° F. to maintain the microporous insulation at about this temperature for an extended period of time. Examples of hydrophilic particulate material which can be utilized in the present invention include, but are not limited to, fumed silica, silica fume, precipitated silica, micron size synthetic amorphous silica and other fumed oxides. The surface area of the hydrophilic inorganic particulate material will generally be greater than 100 $m^2/g$, and preferably, greater than about 150 $m^2/g$.

The hydrophobic inorganic particulate material functions to make the microporous insulation microporous and thermally efficient and to maintain the structural integrity of the microporous insulation after water has been introduced into the microporous insulation material and absorbed by the hydrophilic inorganic particulate material. Examples of hydrophobic inorganic particulate materials which can be utilized in the present invention include, but are not limited to, fumed silica, silica fume, precipitated silica, micron size synthetic amorphous silica and other fumed oxides which have been surface treated to make the materials hydrophobic. A preferred hydrophobic inorganic particulate material is fumed silica which has been surface treated with silane to make the fumed silica water resistant. The surface area of the hydrophobic inorganic particulate material will generally be greater than about 50 $m^2/g$ and preferably, greater than about 90 $m^2/g$.

At least one endothermic compound is employed in the microporous insulation material of the present invention. Examples of the forgoing endothermic compounds which can be utilized in the present invention include, but are not limited to, alumina trihydrate, magnesium carbonate-hydrate, melamine and water. As used herein, the term "endothermic compound" with respect to alumina trihydrate and magnesium carbonate-hydrate means that these materials are endothermic upon dehydration.

At least one opacifier is employed in the microporous insulation material of the present invention. Examples of suitable opacifying agents which can be utilized in the present invention are silicone, titania, calcined clay, magnesium oxide, silicone carbide, carbon and other metal oxides.

At least one type of inorganic fiber is employed in the microporous insulation material of the present invention. Examples of suitable inorganic fibers which can be used in the present invention are quartz fibers, glass fibers, refractory fibers, amorphous fibers, and mineral wool fibers.

When a binder is employed in the microporous insulation material of the present invention, preferably the binder is a dry resin binder such as, phenol formaldehyde or other thermosetting resins.

Preferably, as schematically illustrated in FIG. 1, the microporous insulation material of the present invention is made by preparing a dry mixture of the inorganic particulate material (hydrophilic or a blend of hydrophilic and hydrophobic) and endothermic compound(s) and introducing the inorganic particulate material and endothermic compound(s) into a dry mixer. The opacifier(s), the inorganic reinforcing fibers, and the dry resin binder (if used) are also added to the dry mixer and the ingredients are blended. The blended ingredients forming the microporous insulation material are then pressed to a desired shaped in a conventional press. If desired heat may be applied to set the binder. The shaped microporous insulation can then be further processed, including machining to desired tolerances, or otherwise fabricated for the intended application. In the wet insulation system of the present invention, water can now be introduced into the microporous insulation material to be absorbed by the hydrophilic inorganic particulate material. The amount of water allowed to soak into the wet insulation system is controlled by the amount of hydrophilic inorganic particulate material contained in the microporous insulation material.

Figure 2:
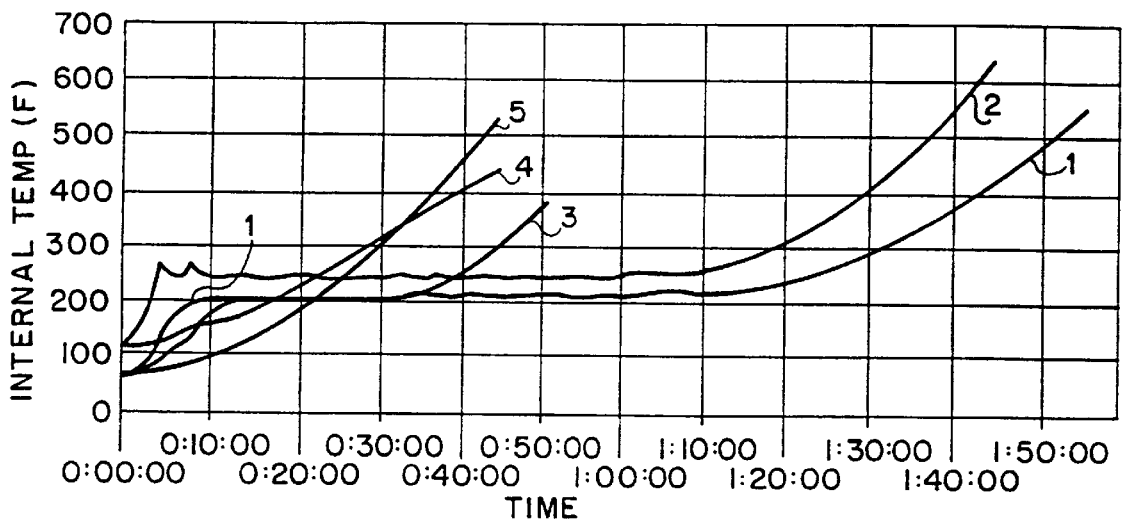
FIG. 2 graphically depicts the temperature versus time characteristics of two embodiments of the present invention and three insulations currently used to shield and insulate flight data recorders.
Figure 3:
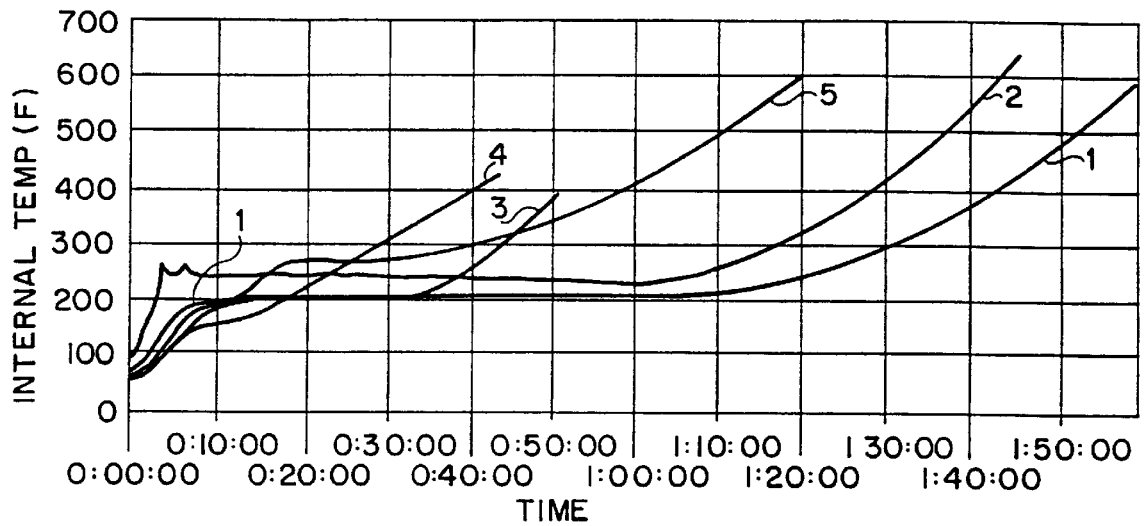
FIG. 3 graphically depicts the temperature versus time characteristics of three embodiments (including an embodiment without water added) of the present invention and two insulations currently used to shield and insulate flight data recorders.

FIGS. 2 and 3 graphically illustrate test results for the microporous insulation of the present invention in its dry form and wet form when compared to examples of insulations currently used to insulate flight data recorders. In the graphs, the insulations currently used to insulate flight data recorders and used for comparison are MIN-K 2000 insulation; MIN-K 1302 insulation (both manufactured by Schuller International Inc.) and E5A-water soaked insulation (manufactured by Minnesota Mining and Manufacturing). The microporous insulation of the present invention in its dry form is referred to as MIN-K 1302 WITH ATH (DRY) in FIG. 3. The microporous insulation of the present invention in its wet form (water soaked) is referred to as MIX 138-MIN-K 1302 W/ATH & WATER and MIN-K 1302 W/WATER in both FIGS. 2 and 3. The amount of hydrophobic fumed silica used in the wet forms was from 5–30 wt % of the fumed silica. The insulation samples were of the same thickness, enclosed an aluminum heat sink where the temperature was measured and were placed in a furnace having a temperature of about 2000° F.

The test results show that the microporous insulation of the present invention (wet form) maintained the temperature of the aluminum heat sink below 300° F. for an extended period of time much greater than that of the currently used insulation materials. The test results show that the microporous insulation of the present invention (dry form) maintained the temperature of the aluminum heat sink below 300° F. for a longer period of time than the currently used MIN-K 1302 insulation and MIN-K 2000 insulation.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A microporous insulation material comprising, in weight percent based upon the dry weight of the microporous insulation material:
   (a) 20–60 wt % inorganic particulate material;
   (b) 10–60 wt % endothermic compound;
   (c) 5–20 wt % opacifier;
   (d) 3–15 wt % inorganic fiber;
   (e) 0–6 wt % dry resin binder; and
   50–89 wt % being said inorganic particulate material and said endothermic compounds, said inorganic particulate material being a different substance than said endothermic compound.

2. A microporous insulation material according to claim 1, wherein: said inorganic particulate material has a surface area greater than about 50 m$^2$/g.

3. A microporous insulation material according to claim 1, wherein: said inorganic particulate material is fumed silica.

4. A microporous insulation material comprising:
   (a) 20–60 wt % inorganic particulate material;
   (b) 10–60 wt % endothermic compound selected from the group consisting of alumina trihydrate, magnesium carbonate-hydrate and melamine;
   (c) 5–20 wt % opacifier;
   (d) 3–15 wt % inorganic fiber;
   (e) 0–6 wt % dry resin binder; and
   50–89 wt % being said inorganic particulate material and said endothermic compounds.

5. A microporous insulation material comprising:
   (a) 20–60 wt % inorganic particulate material, 5–50 wt % of said inorganic particulate material being hydrophobic and (a) the remainder of said inorganic particulate material being hydrophilic;
   (b) 0–60 wt % endothermic compound;
   (c) 5–20 wt % opacifier;
   (d) 3–15 wt % inorganic fiber;
   (e) 0–6 wt % dry resin binder; and 50–89 wt % being said inorganic particulate material and said endothermic compounds.

6. A microporous insulation material according to claim 5, wherein: said hydrophilic inorganic particulate material has a surface area greater than about 100 m$^2$/g and said hydrophobic inorganic particulate material has a surface area greater than about 50 m$^2$/g.

7. A microporous insulation material according to claim 6, wherein: said hydrophilic inorganic particulate material and said hydrophobic inorganic particulate material are precipitated silica.

8. A microporous insulation material according to claim 5, wherein: said endothermic compound is selected from the group consisting of alumina trihydrate, magnesium carbonate-hydrate and melamine.

9. A microporous insulation material according to claim 1, wherein: about 5–30 wt % of said inorganic particulate material is hydrophobic and the remainder of said inorganic particulate material is hydrophilic.

10. A microporous insulation material according to claim 1, wherein: said dry resin binder is 1–6 wt % of the microporous insulation material.

11. A microporous insulation material according to claim 10, wherein: said dry resin binder is a thermosetting resin.

12. A microporous insulation material according to claim 1, wherein: said inorganic particulate material is hydrophilic.

13. A microporous insulation material according to claim 12, wherein: said inorganic particulate material has a surface area greater than about 100 m$^2$/g.

14. A microporous insulation material according to claim 13, wherein: said inorganic particulate material is fumed silica.

15. A microporous insulation material according to claim 12, wherein: said endothermic compound is selected from the group consisting of alumina trihydrate, magnesium carbonate-hydrate and melamine.

16. A microporous insulation material according to claim 12, wherein: said dry resin binder is 1–6 wt % of the microporous insulation material.

17. A microporous insulation material according to claim 16, wherein: said dry resin binder is a thermosetting resin.

18. A microporous insulation material according to claim 5, including: water carried by said hydrophilic inorganic particulate material.

19. A microporous insulation material comprising:
   (a) 34–38 wt % inorganic particulate material;
   (b) 47–51 wt % endothermic compound;
   (c) 7–8 wt % opacifier;
   (d) 4–6 wt % inorganic fiber;
   (e) 0–3 wt % dry resin binder; and 50–89 wt % being said inorganic particulate material and said endothermic compounds, said inorganic particulate material being a different substance than said endothermic compound.

20. A microporous insulation material according to claim 19, wherein: about 13–17 wt % of said inorganic particulate material is hydrophobic and the remainder of said inorganic particulate material is hydrophilic.

21. A microporous insulation material according to claim 19, wherein: said dry resin binder is about 2 wt % of the microporous insulation material.

22. A microporous insulation material according to claim 20, including: water carried by said hydrophilic inorganic particulate material.

23. A microporous insulation material comprising:
   (a) 28–32 wt % inorganic particulate material;
   (b) 48–52 wt % endothermic compound;
   (c) 13–17 wt % opacifier;
   (d) 4–5 wt % inorganic fiber;
   (e) 0–6 wt % dry resin binder; and 50–84 wt % being said inorganic particulate material and said endothermic compounds, said inorganic particulate material being a different substance than said endothermic compound.

24. A microporous insulation material according to claim 23, wherein: about 13–17 wt % of said inorganic particulate material is hydrophobic and a remainder of said inorganic particulate material is hydrophilic.

25. A microporous insulation material according to claim 24, including: water carried by said hydrophilic inorganic particulate material.

26. A microporous insulation material according to claim 1 further comprising water absorbed by the inorganic particulate material.

* * * * *